United States Patent [19]

Welker

[11] Patent Number: 4,659,100
[45] Date of Patent: Apr. 21, 1987

[54] TRAILER
[76] Inventor: T. L. Welker, 2109 Kessler Ct., Dallas, Tex. 75208
[21] Appl. No.: 820,024
[22] Filed: Jan. 21, 1986
[51] Int. Cl.⁴ .............................................. B60P 3/10
[52] U.S. Cl. .............................. 280/414.1; 280/43.18; 414/483
[58] Field of Search ............... 280/656, 414.1, 43.11, 280/43.18; 414/482, 483, 484, 485

[56] References Cited
U.S. PATENT DOCUMENTS 2,478,795  8/1949  Whalen et al. ................. 280/414.1
2,650,730  9/1953  Rohm ............................ 280/414.1

Primary Examiner—John J. Love
Assistant Examiner—Donn McGiehan
Attorney, Agent, or Firm—Andrew M. Hassell

[57] ABSTRACT

An improved trailer specially adapted for motorcycles and the like having two principal assemblies connected together in a hinge arrangement at the rear ends thereof; and which, through a cooperative levering action using two wheel stub axles as the fulcrum, provides for loading essentially parallel to and in contact with the ground while employing a single spring to provide resilient supportive action to the load by the wheels while the load is being transported.

8 Claims, 5 Drawing Figures

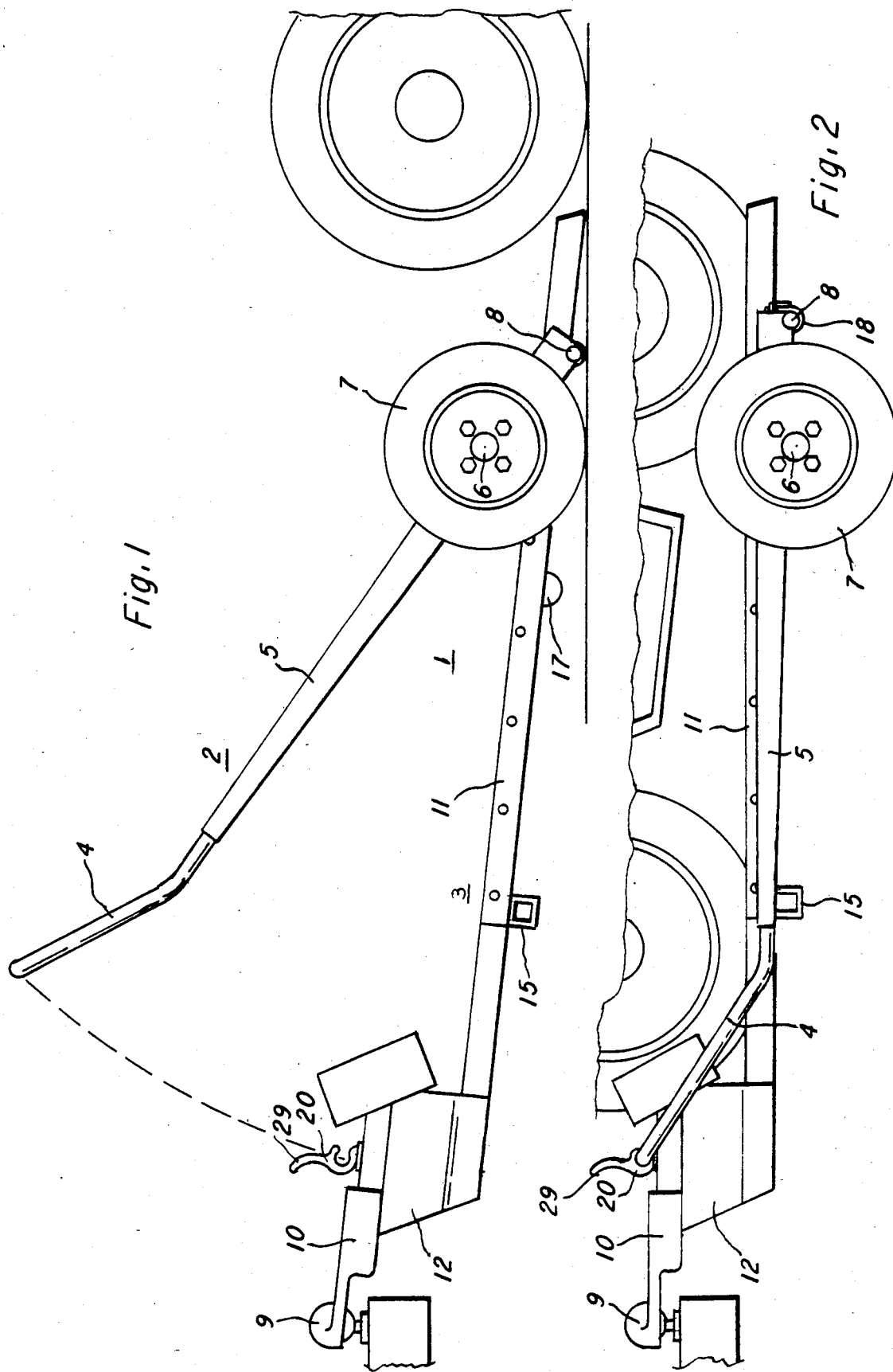

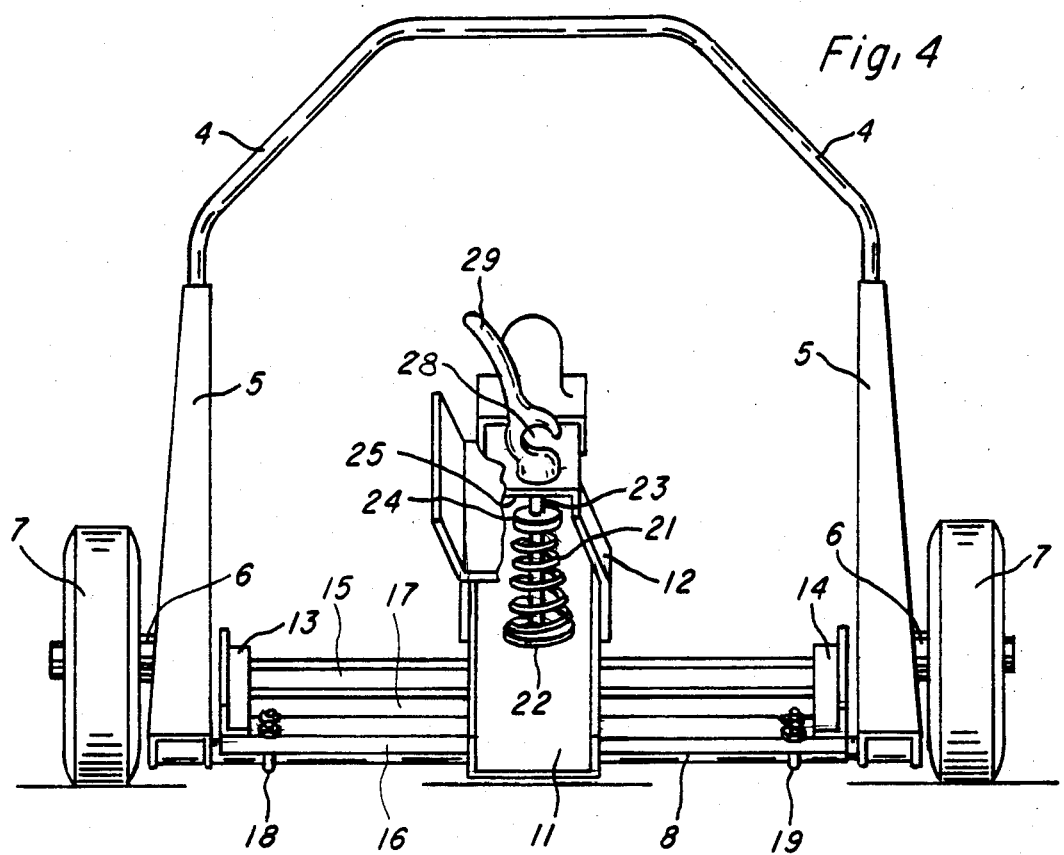
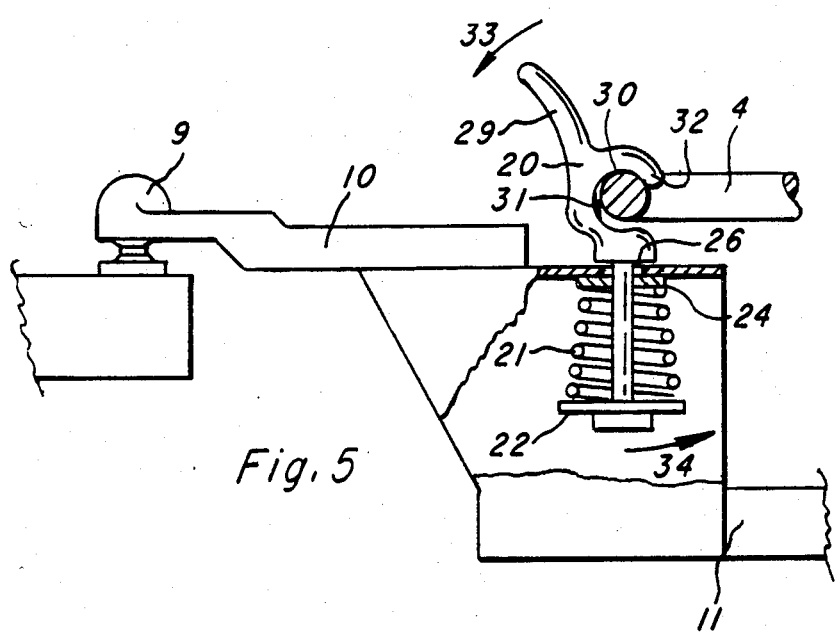

TRAILER

This invention relates to trailers and more particularly to trailers that are adapted for carrying items such as motorcycles and the like.

BACKGROUND OF THE INVENTION

Motorcycle trailers have heretofore been proposed, illustrative of which are those described and depicted in U.S. Pat. No. 2,988,382 granted to L. F. Holland on June 13, 1961, U.S. Pat. No. 3,625,545 granted to Howard Somers and Hugh Wolcott on Dec. 7, 1971, U.S. Pat. No. 3,788,675 granted to Roger Wilander on Jan. 29, 1974 and U.S. Pat. No. 4,490,089 granted to T. L. Welker on Dec. 25, 1984.

While proposals such as those advanced in these patents have constituted significant advances in the art, there has been a continuing need to further simplify construction and reduce cost. Accordingly, efforts to further improve trailers have continued.

BRIEF SUMMARY OF THE INVENTION

The apparatus of this invention provides an improvement in simplicity and cost reduction through the cooperative relationship between two principal assemblies connected together in a hinge arrangement at the rear ends thereof and a levering action using portions of two wheel axle stubs as the fulcrum together with a see-saw bar and a unique unitary spring assembly. This cooperative arrangement provides the desired raising and lowering mechanical advantage and ease of operation while permitting elimination of the prior art individual wheel springs and instead utilizes one unitary spring to provide resilient trailering of the load, thus improving simplicity and reliability, and reducing cost.

OBJECTS AND FEATURES

It is one general object of this invention to improve motorcycle type trailers.

It is another object of this invention to simplify construction, improve reliability and reduce cost.

It is another object of this invention to improve manual handling of the trailer by improving balance.

It is yet another object of this invention to reduce the vertical thrust (i.e., the strength required) to raise a load into towing position.

Accordingly, in accordance with one feature of the invention, the offset axle of the prior art is eliminated while maintaining the advantages of rear hinge construction and loading essentially parallel to and in contact with the ground.

In accordance with another feature of the invention, the rear hinge, axle pivots and a single spring disposed near the front portion of the trailer tongue are deployed in cooperative relation whereby the individual springs for each wheel are eliminated while maintaining resiliency of transport, thus improving reliability while reducing complexity and cost.

In accordance with still another feature of the invention, a see-saw bar is positioned on the load-supporting frame approximately halfway from front to rear, thereby significantly reducing the strength required to raise the load.

These and other objects and features will be apparent from the following detailed description by way of reference to the drawing.

BRIEF DESCRIPTION OF THE DRAWING

FIG. 1 is a side elevation view depicting the trailer of this invention in the loading position with the lever assembly in the raised position;

FIG. 2 is a side elevation view depicting the trailer in the raised position and attached to a towing vehicle;

FIG. 4 is a rear end view of the trailer with the lever assembly in the raised position; and FIG. 5 is a detail showing the arrangement of the cushioning spring.

DETAILED DESCRIPTION OF A PREFERRED EMBODIMENT

Figure 3:
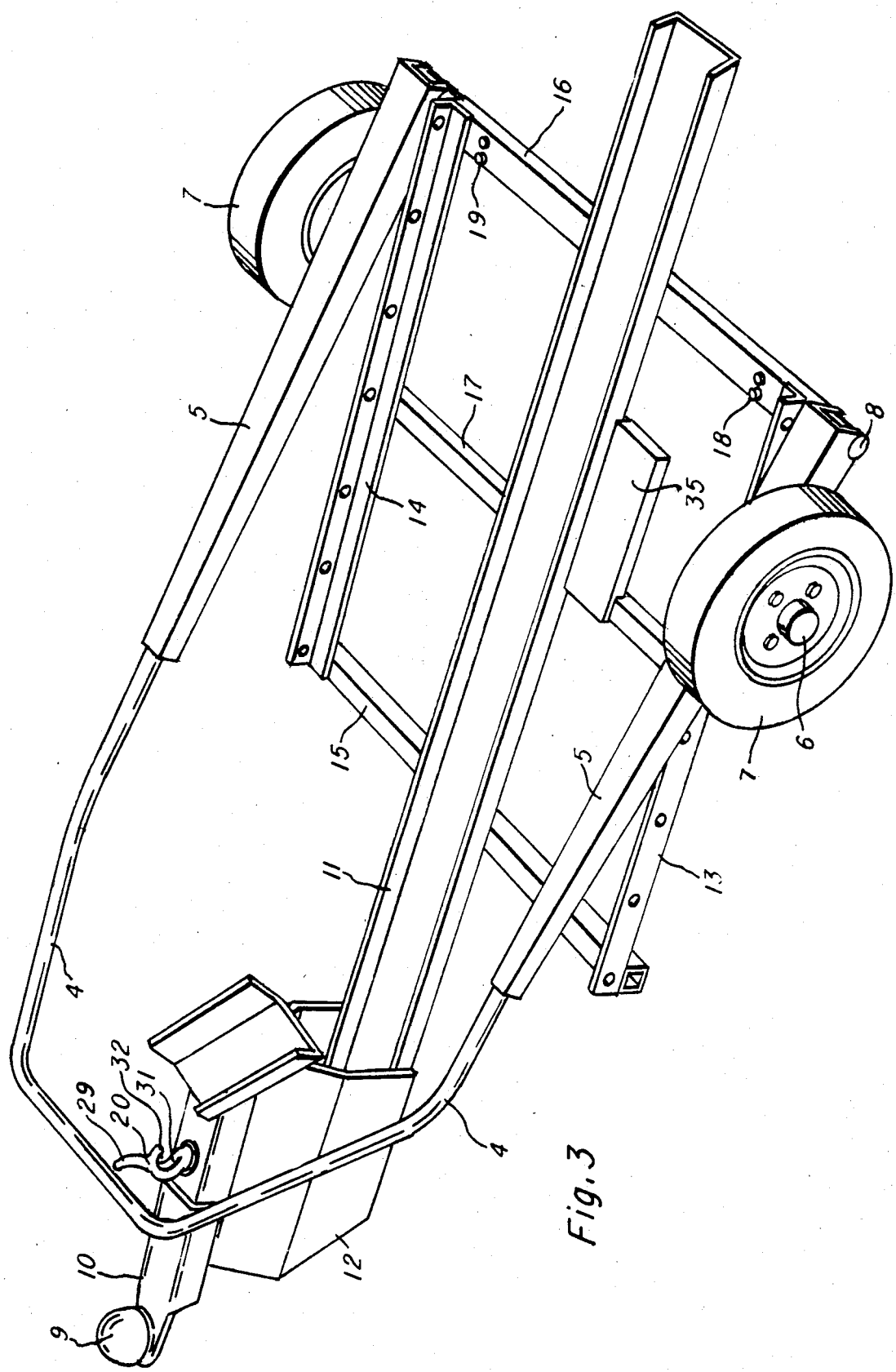
FIG. 3 is a perspective view depicting the trailer in the loading condition with the lever assembly in the raised position.

Now turning to the figures of the drawing in which like symbols designate like parts, FIG. 1 is seen to depict the side elevation view of a trailer generally shown at 1 and comprising two principal assemblies, lever assembly 2, and load-supporting assembly 3. The lever assembly 2 is shown in the raised, or loading position in which the corresponding position of the load-supporting assembly 3 is at a slight inclination because of the elevated position of trailer hitch 9 as it is supported by a towing vehicle. If, however, hitch 9 were disconnected from the towing vehicle and permitted to descend until see-saw bar 17 was in contact with the ground, the load-supporting assembly 3 would be in contact with and essentialy parallel with the ground; whereas in FIG. 2, the lever assembly 2 is shown in the lowered, or loaded position, and the corresponding position of the load-supporting assembly 3 is in a raised position ready for towing.

Now turning to FIG. 3, the parts of the trailer are depicted in greater detail. Here, it will be observed, the lever assembly 2 is seen to comprise a forward extending portion 4, longitudinal side members 5 to which are attached stub axles 6 and wheels 7, and rear transverse bar 8.

The load-supporting assembly is seen to comprise conventional trailer hitch 9; a forward extension 10; a main load-receiving channel 11 adapted for receiving the front and rear tires of a motorcylce and positioned centrally (from side to side) of the frame as shown: spring housing 12 interconnecting extension 10 and channel 11; laterally disposed side members 13 and 14; transversely disposed front and rear channels 15 and 16; and see-saw bar 17. The see-saw bar 17 is positioned about midway (from front to rear) of the side members 13 and 14 (as shown) such that it is at about the balance point of the load for which the trailer is designed. Also included is kick stand support 35.

The parts of the assemblies are fastened together by conventional techniques such as bolting or welding and thus achieve structural rigidity and strength.

Rear channel 16 of load-supporting assembly 3 is disposed on top of rear transverse bar 8 such that the bar 8 resides up within the channel space (FIG. 4) and channel 16 is prevented from inadvertently disassociating from bar 8 by a pair of U clamps 18 and 19. Together, rear channel 16 and transverse bar 8 act as a hinge to movably connect the lever assembly 2 and the load-supporting assembly 3.

In the embodiment shown, the main load-receiving channel 11 projects outwardly about two feet from the rear of the rear end (channel 16) of the load-supporting assembly 3, that is, from the rear of the trailer, in order to comfortably load a very large machine, i.e., a Gold Wing model Honda motorcycle. However, for smaller models, the channel may terminate essentially at the rear of the trailer, i.e., at channel 16.

As heretofore mentioned, the single spring 21 acts to provide a cushioning effect for both wheels, thereby eliminating the need for the two individual springs conventionally provided. The advantageous action of the single spring can be understood when it is recognized that vertical thrust imparted to the wheels (and tending to move the wheels vertically) results in a corresponding vertical component conducted to the forward extending portion 4 of the lever assembly 2. This in turn tends to move the forward part vertically a distance proportional to such thrust. However, the movement of the forward part is constrained by the action of the spring 21 which is disengageably connected to the forward portion 4 through locking handle 20. If extending portion 4 tends to rise (when increased vertical thrust is imparted to one or both of the wheels as by a bump), pressure on the spring correspondingly increases, the spring is additionally compressed and the tongue moves slightly according to the degree of spring compression. On the other hand, if the vertical thrust is momentarily decreased (as when one or both of the wheels encounters a depression in the roadway surface), the normally existing spring compression is decreased and the tongue is permitted to travel a corresponding distance, thus again providing a cusioning effect on the load.

The spring housing 12 is shown as part of the load-supporting assembly. However, it is not critical to the inventive concepts hereof whether the spring housing is a part of the load-supporting assembly or a part of the lever assembly. It is, however, important that the spring is housed or supported and connected between the tongue portions of the two assemblies such that it resiliently interconnects them and thus resiliently accepts thrust between them in such manner as to provide cushioning effect to the wheels of the trailer as is described above.

Returning to the spring housing 12, it will be seen to house coil spring 21, lower washer 22, bolt 23 and upper washer 24. Bolt 23 is affixed to lower washer 22 but slidably extends through upper washer 24 such that it can freely move therethrough. Washer 24 provides a surface for engagement of the upper end of spring 21 and through which compressive force in the spring can be conveniently transmitted to the inner upper surface 25 of the housing. However, it is not a necessary part of the spring assembly. Thus, if the upper end turn of the spring is flattened or otherwise prepared for engagement with the inner surface of spring housing 12 directly, the washer 24 can be eliminated.

The overall dimensions of the trailer are not critical and the principles herein described can be applied to a substantial range of geometries. However, a trailer constructed especially for the Gold Wing model motorcycle manufactured by Honda had the following dimensions.

| Item | Description | Dimension (inches) |
| --- | --- | --- |
| 4 | Forward Bar | 48 |
| 5 | Side Member | 40 |
| 8 | Rear Transverse Bar | 48 |
| 11 | Load Receiving Channel | 84 |
| 13 | Side Member | 48 |
| 14 | Side Member | 48 |

-continued

| Item | Description | Dimension (inches) |
| --- | --- | --- |
| 15 | Front Channel | 39 |
| 16 | Rear Channel | 39 |
| 17 | See-Saw Bar | 36 |

In addition to these dimensions, the distance between the centerline of the stub axles 6 and the centerline of bar 8 (FIG. 3) was 8 inches; and the distance from the rear edge of load-receiving channel 11 to the rear surface of channel 16 was twenty-four and one-half inches.

The see-saw bar 17 for the foregoing trailer was made of a two and five-eights inch rounded bar and thus projected downwardly approximately two and five-eighths inches below the lower surface of the sides 13 and 14 of the load-supporting assembly 3. Consequently, and since it extended downwardly for a greater distance than front and rear channels 15 and 16, when the trailer was in the loading position, it engaged the ground and acted as the fulcrum of a see-saw. Accordingly, during the first few inches of travel of the front part of the lever assembly (when the load was being lifted into towing position), the load-supporting assembly rose at the rear while much of the weight of the load was still being borne by the see-saw bar, thus making it much easier to begin raising the load than when the see-saw bar was absent. Since it is has been found that in the absence of the see-saw bar, the force required to initiate raising of the load was at or near its greatest during this initial part of the raising procedure, the see-saw bar contributes significantly to reducing the maximum strength required to comfortably operate the trailer.

In the preferred embodiment, spring housing 12 contains a slotted aperture 26 through which bolt 23 slidably protrudes. The purpose of the slot is to permit swiveling action of bolt 23 such that the top of the bolt can swivel toward the front and rear of the trailer while the lower part moves in the opposite direction (e.g., as shown by arrows 33 and 34 in FIG. 5), thus permitting disengagement of portion 4 from open region 28 (FIG. 4) of locking handle 20.

Operation of the preferred embodiment is as follows. With the tongue of the trailer either disconnected from the towing vehicle and in contact with the ground or with it positioned on the towing vehicle, the forward extending portion 4 of lever assembly 2 is disconnected from the spring 21 by pressing down on portion 4 while rocking the upper portion of locking handle 20 forward to permit disengagement. It is then raised to the upper position (as shown in FIGS. 1 and 3), thus lowering the load-supporting assembly 3. If the tongue is disconnected from the towing vehicle and in contact with the ground, the load-supporting assembly assumes a position essentially parallel to and in contact with the ground. On the other hand, if the tongue is connected to the towing vehicle, the rear of the load-supporting assembly contacts the ground and the load-supporting channel 11 assumes an inclined position (as shown in FIG. 1).

Reference to FIG. 5 shows the locking handle 20 in detail. It comprises an extending gripping portion 29 adapted for ease of gripping and manual manipulation, and a generally c-shaped part 30 having an inner curved surface 31 defining an area 28 (FIG. 4) which is adapted for mating with the generally circular part of forward bar 4 (FIG. 5). The locking handle is fitted with a threaded hole (not shown) adapted to receive the upper threaded end of bolt 23 so that it can be screwed onto bolt 23 as shown.

As mentioned previously, the aperture 26 is slotted with the long dimension of the slot being from front to rear, thus permitting swiveling (rocking) of the bolt 23 in a front to back direction (FIG. 5). When the lever arm is to be lowered and locked into position, handle 20 is tilted toward the front of the trailer to permit passage of the mating portion of the forward extending bar 4 past the lip 32. The handle is then returned to the upright position and, as it moves, it receives the forward part of the bar 4 within the space bounded by lip 32 and curved inner surface 31, that is, within area 28 (FIG. 4). Since the weight of the load-supporting frame and load create an upward thrust on the bar 4, it locks into place and will not disengage therefrom unless and until an overriding downward thrust is imparted manually to bar 4.

When the load is removed from the trailer (e.g., when a motorcycle is backed off supporting channel 11), the weight of forward extension 4 tends to cause extension 4 abruptly to lower, thus raising channel 11. In order to prevent this from occurring, a small gas-type shock (not shown) similar to those conventionally employed to retain automobile trunk lids in the raised position may be connected between the load-supporting and lever assemblies at any convenient points just forward of the wheel stub axles.

It will now be seen that there is herein described an improved trailer that provides resiliency of ride with a single spring, eliminates the need for an offset axle while preserving advantages of rear hinge construction, and which advantageously employs a see-saw bar to reduce effort required for loading and operating.

Although the inventions hereof have been described by way of example of a preferred embodiment, it will be evident that other adaptations and modifications may be employed without departing from the spirit and scope thereof. For example, the single spring could be of the leaf or other variety, and various other ways could be employed to achieve engagement with the tongues of the load-supporting assembly and lever assembly. Moreover, the see-saw bar could be made hollow provided it retained sufficient strength to support the load.

The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A trailer comprising a main lever assembly with a first tongue portion, a pair of rearward extensions of said tongue portion and a first rear laterally disposed member connecting said tongue portion and rearward extensions into a semi-rigid frame, said first laterally disposed rear member having a portion adapted in form one part of a hinge; a pair of stub axles severally disposed on said rearward extensions in juxtaposed relation a predetermined distance forward of said hinge part and each having a wheel mounted thereon exteriorly to said extension; a main load-supporting assembly having a second tongue portion adapted for connection to a towing vehicle, a second pair of rearward extensions, a second laterally disposed rear member connecting the rear portions of said second pair of rearward extensions into a rigid load-supporting frame, said second laterally disposed rear member being disposed in mating relation to said first laterally disposed rear member to form a rear hinge movable connecting said main structural assembly to said main load-supporting assembly; a spring and housing means for positioning said spring between said first tongue portion and said second tongue portion, said spring and housing means including means adapted to interconnect said first tongue portion with said second tongue portion through said spring when said trailer is in condition for towing, to conduct thrust between the tongue portions of said frame assembly and load-supporting assembly through said spring thereby to permit retardably resisted movement therebetween and cushion road-imparted thrust on said wheels when said trailer is in motion.

2. A trailer in accordance with claim 1 further including a transverse see-saw bar mounted on the under surface of said load-supporting assembly at about the balance point of the load thereon.

3. A trailer in accordance with claim 2 wherein said housing means for said spring is mounted on said second tongue portion.

4. A trailer in accordance with claim 1 wherein said housing means for said spring is mounted on said second tongue portion.

5. A trailer in accordance with claim 1 wherein said spring is a single unitary member.

6. A trailer in accordance with claim 1 wherein said stub axles are each affixed to its associated extension to terminate prior to projecting inwardly of said associated extension.

7. A trailer having a load-supporting frame disposed in a generally longitudinal position, said load-supporting frame having a forward extending portion adapted for attachment to towing equipment and a rear portion comprising one part of a hinge; a lever assembly comprising a levering frame at least partially surrounding said load-supporting frame and having at its forward portion thereof means for receiving vertical thrust and in response thereto, for imparting corresponding movement to said forward portion and further having at its rear portion a second part of a hinge adapted for mating with said one part of said hinge, said lever assembly further including a predetermined distance forward of the rear thereof, a pair of wheels mounted with stub axles on the sides of said lever assembly to form the fulcrum of a lever comprising the forward and rear portions of said lever assembly; and a single spring assembly interconnecting the forward parts of said lever assembly and said load-supporting frame when said load-supporting frame is in a raised condition thereby to provide spring cushioning to both of said wheels of said trailer.

8. A trailer in accordance with claim 7 further including a see-saw bar mounted on the under surface of said load-supporting frame at about the balance point of the load thereon.

* * * * *